United States Patent [19]
Johnson

[11] 3,916,810
[45] Nov. 4, 1975

[54] STABILIZING MEANS FOR AIR OR WATER BORNE VEHICLES

[76] Inventor: Charlie L. Johnson, 1402 Rapides Ave., Alexandria, La. 71301

[22] Filed: Mar. 30, 1973

[21] Appl. No.: 346,696

[52] U.S. Cl.................................. 114/124; 244/93
[51] Int. Cl........................................... B63b 39/00
[58] Field of Search ....... 114/124, 122, 121, 235 A; 244/87, 93

[56] References Cited
UNITED STATES PATENTS
3,683,839   8/1972   Harbisch....................... 114/235 A

*Primary Examiner*—Trygve M. Blix
*Assistant Examiner*—Charles E. Frankfort

[57] ABSTRACT

A stabilizer having a pair of axially aligned, oppositely threaded screws fixed relative to a vehicle; a free frame mounted coaxially of said screws and surrounding the same; arms depending from said frame and engaging said screws, said arms being directed at an angle to the axis of said screws and also being directed to intersect said axis.

6 Claims, 6 Drawing Figures

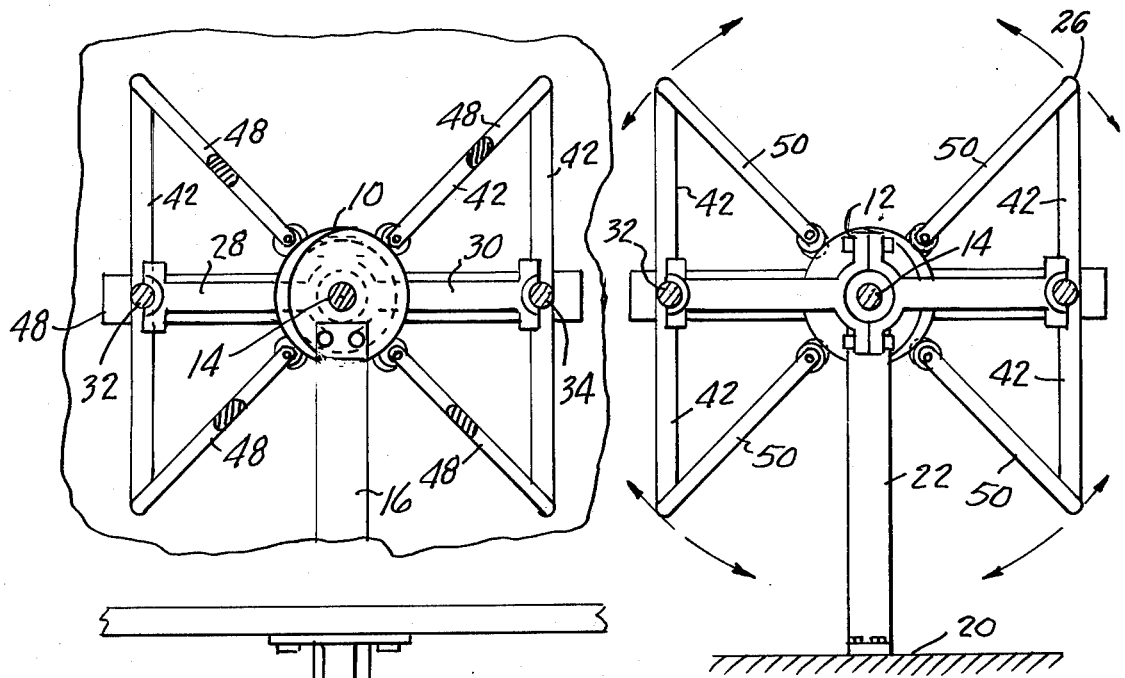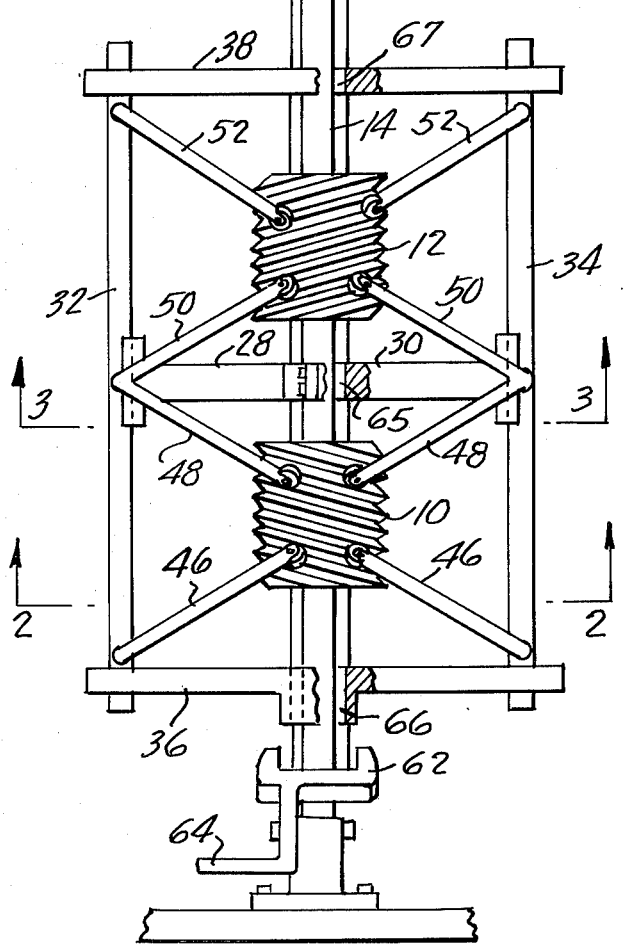

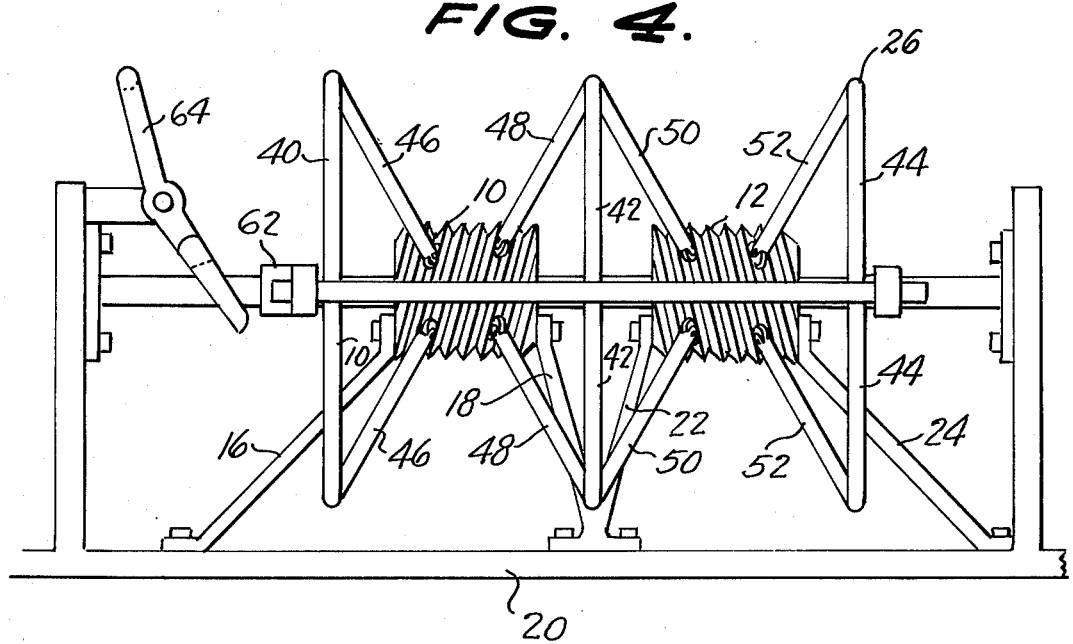
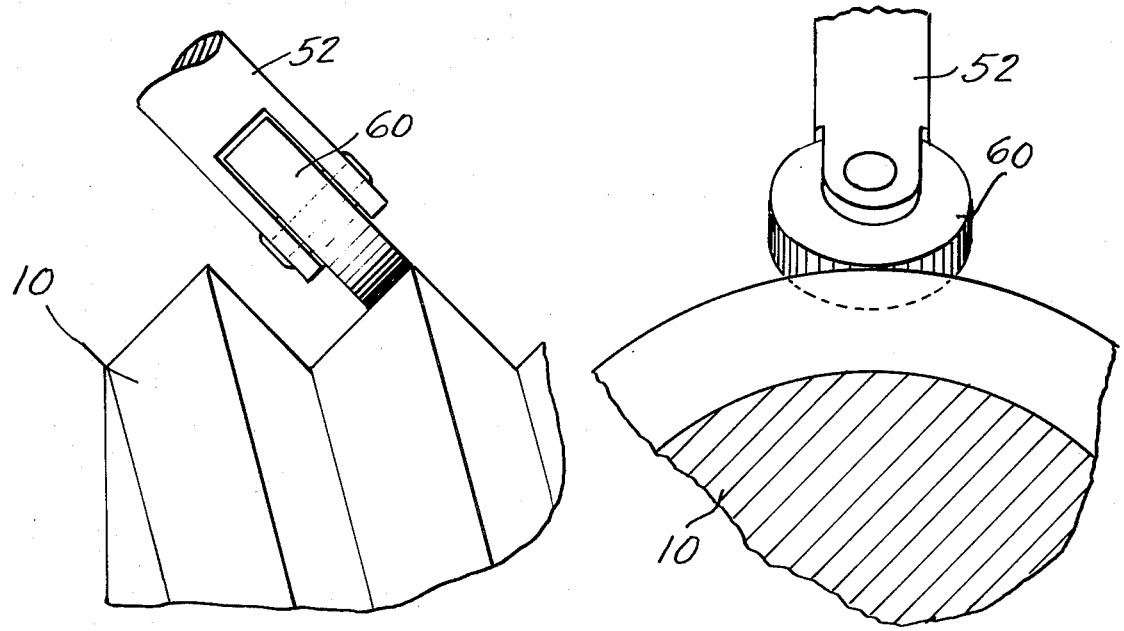

STABILIZING MEANS FOR AIR OR WATER BORNE VEHICLES

This invention relates to means for stabilizing a vessel or aircraft having an intended relationship between its axis and the earth. The stabilizing means of this invention is intended to resist and/or inhibit sudden or unexpected deviations in the position of such axis as may occur due to waves or air turbulence.

The prior art affords some instances, particularly for ship stabilization involving the shifting of relatively great masses relative to the axis of the ship in order to inhibit or overcome the familiar pitch, yaw and roll. However, since in such devices the mass shifted must be comparable to the force exerted on the ship, such means are utterly unadaptable to airplanes and not particularly practical in any event.

The most common and best known device for stabilizing purposes is the gyroscope which substitutes velocity for mass and is capable of producing a very large corrective force relative to a rather small disruptive force. This has the excellent effect of minimizing mass but because the rpm must be very great in order to create an energy equivalent of mass, problems of dynamic balance, bearing fitting, etc., greatly raise the cost of such stabilizers.

Accordingly, it is an object of the present invention to devise a stabilizer of minimum mass and with a minimum of moving parts which do not involve problems of dynamic balance nor the extreme of precision in fitting the parts.

The above and other objects will be made clear from the following detailed description taken in connection with the annexed drawings, in which:

FIG. 1 is a top plan view of the apparatus;
FIG. 2 is a section of the line 2—2 of FIG. 1;
FIG. 3 is a section on the line 3—3 of FIG. 1;
FIG. 4 is a side elevation of the machine;
FIG. 5 is a detail view showing the relationship with the thread follower to the thread; and
FIG. 6 is a view similar to FIG. 5, but at right angles thereto.

Referring now to FIG. 1, there is shown a pair of screws 10 and 12 freely mounted on shaft 14. As best shown in FIG. 4, the screw 10 is fixed by means of brackets 16 and 18 to the deck 20 representing any fixed part of the vessel or aircraft. Similarly, the screw 12 is secured to the deck 20 by means of brackets 22 and 24. As a result, the screws 10 and 12 are responsive to any movement of the ship's axis.

Surrounding the shaft 14 and the screws 10 and 12 is a frame generally designated 26. The frame 26 is made up of a pair of central struts 28 and 30 bolted together around the shaft 14 and connecting at their outer extremities to a pair of side members 32 and 34 which are connected at their extremities by cross members 36 and 38. Air spaces 67 and 66 separate cross members 38 and 36, respectively, from shaft 14, while struts 28 and 30 are similarly spaced from shaft 14 by air space 65. This arrangement permits frame 26 to float around shaft 14.

Pairs of vertical arms 40 rise from side members 32 and 34 adjacent the cross member 36, while similar members 42 rise from the cross member 36, and similar members 44 are adjacent the cross member 38. The vertical members 40 terminate in inclined arms 46, while the vertical arms 42 terminate in inclined arms 48 and 50, and the vertical arms 44 terminate in inclined arms 52. Each of the arms 46, 48, 50 and 52 terminates in a roller follower 60 which bears in and on one of the threads of screws 10 or 12, as best shown in FIGS. 5 and 6. The inclination of each of the arms is such that if prolonged, it would intersect the axis of the shaft 14.

As will be clear from FIGS. 1 and 4, the screws 10 and 12 are oppositely pitched. The screw 10 is engaged by two pairs of arms 46 and two pairs of arms 48 of opposite inclination, while the screw 12 is engaged by two pairs of arms 50 and two pairs of arms 52, also of opposite inclination. It will be seen from FIGS. 2 and 3 that any movement of the frame 26, clockwise or counterclockwise relative to the screws 10 and 12, will deform the various inclined arms and set up thereby a resistance to such relative movement which, since the screws 10 and 12 are fixed relative to the hull or fuselage of the vessel or aircraft, will tend to inhibit such movement. Now, a slowly executed, planned move such as an ordinary change of course will occur reasonably slowly and will not affect the mechanism just described. If, however, the move is sudden and unexpected, as might occur by reason of waves or air turbulence, the inertia of the frame 26 will operate to flex the various inclined arms and thereby set up a resistance as aforesaid. This stabilizing effect is desirable during normal flights or voyages.

The amount of inertia of the frame, namely, its mass, is a matter of design. The frame will have a mass in accordance with the required amount of resistance to undesired movement of the associated vehicle. This, in turn, will depend upon the mass of a vehicle with which the device is employed and the type of unexpected movements to be resisted.

In a plane, particularly of the fighter type, however, such stabilizing could be detrimental during a dog fight for which reason means are provided for locking out the stabilizer effect when desired. This is done by means of a ordinary jaw clutch 62 slidable on the shaft 14 by means of a hand lever 64 and engaging a hub 66 formed on the cross member 36 and serving to lock out any movement of the frame 26 relative to the shaft 14.

Various arms 46 and 48, 50 and 52 constitute cantilevers and it is well known that in all types of beams a suddenly applied load induces twice the stress of the same load applied slowly. It is, therefore, possible to obtain high resistance to sudden movements without, however, resorting to extreme mass, as has been the case heretofore or to the complexities and refinements of a gyroscope in which rotational velocity is a substitute for mass.

While certain specific embodiments have been described in the course of this disclosure, it is not intended to limit this invention to the precise details disclosed but only as set forth in the subjoined claims.

What is claimed is:

1. In a vehicle, stabilizer means comprising a pair of axially aligned, oppositely threaded screws, means fixedly securing said screws to the vehicle, a freely movable frame mounted coaxially of and surrounding said screws, flexible arms extending from said frame and having portions in driving engagement with the threads of said screws, said arms being directed at an angle to said screws and also being directed to intersect the common axis of the screws, said arms being flexibly deformable because of the inertia of the frame to develop a resistance to movement of the frame relative to the screws, whereby to inhibit such movement.

2. Stabilizer means as set forth in claim 1, including means to at times fix said frame relative to said screws.

3. Stabilizer means as set forth in claim 1, including roller followers at the end of each of said arms for engaging the threads of said screws.

4. Stabilizer means as set forth in claim 1, in which said arms are in oppositely directed pairs.

5. Stabilizer means as set forth in claim 4, including roller followers at the end of each said arms for engaging the threads of said screws.

6. Stabilizer means as set forth in claim 5, including means to at times fix said frame relative to said screws.

* * * * *